March 23, 1937.  J. McCLAIN  2,074,753
GAUGE
Filed Dec. 15, 1933    2 Sheets-Sheet 1
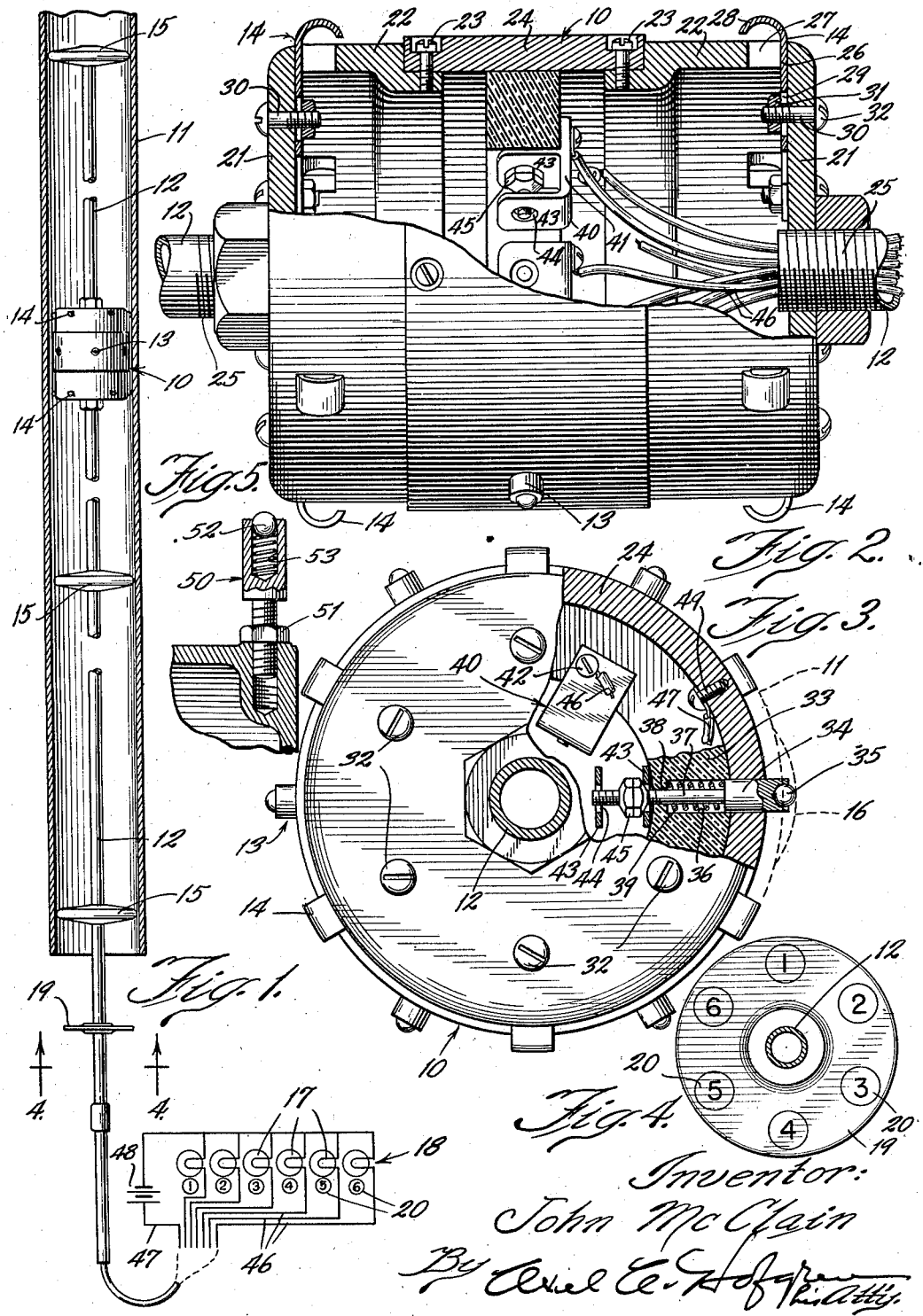
Inventor:
John McClain March 23, 1937. J. McCLAIN 2,074,753
GAUGE
Filed Dec. 15, 1933   2 Sheets-Sheet 2
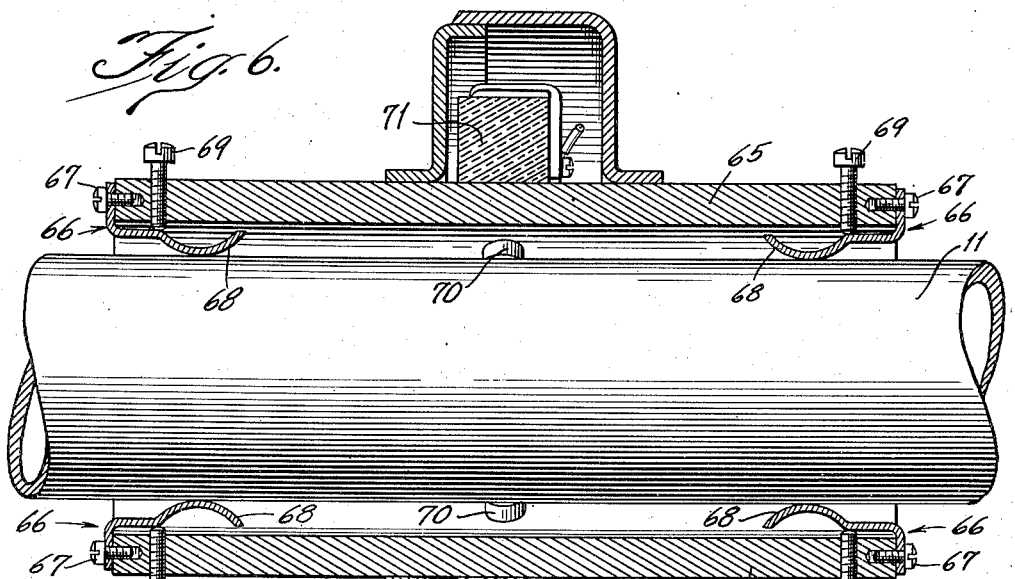
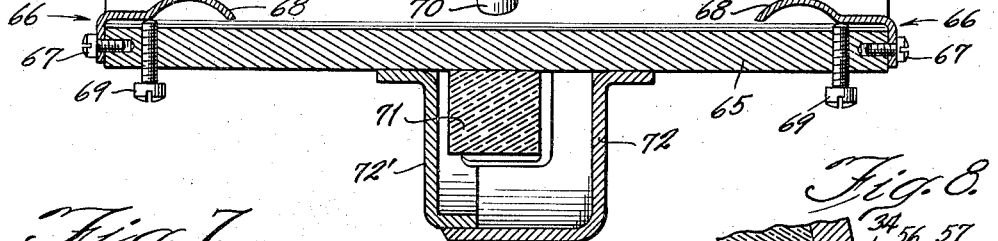
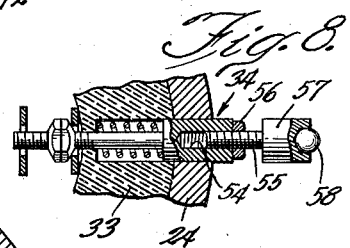
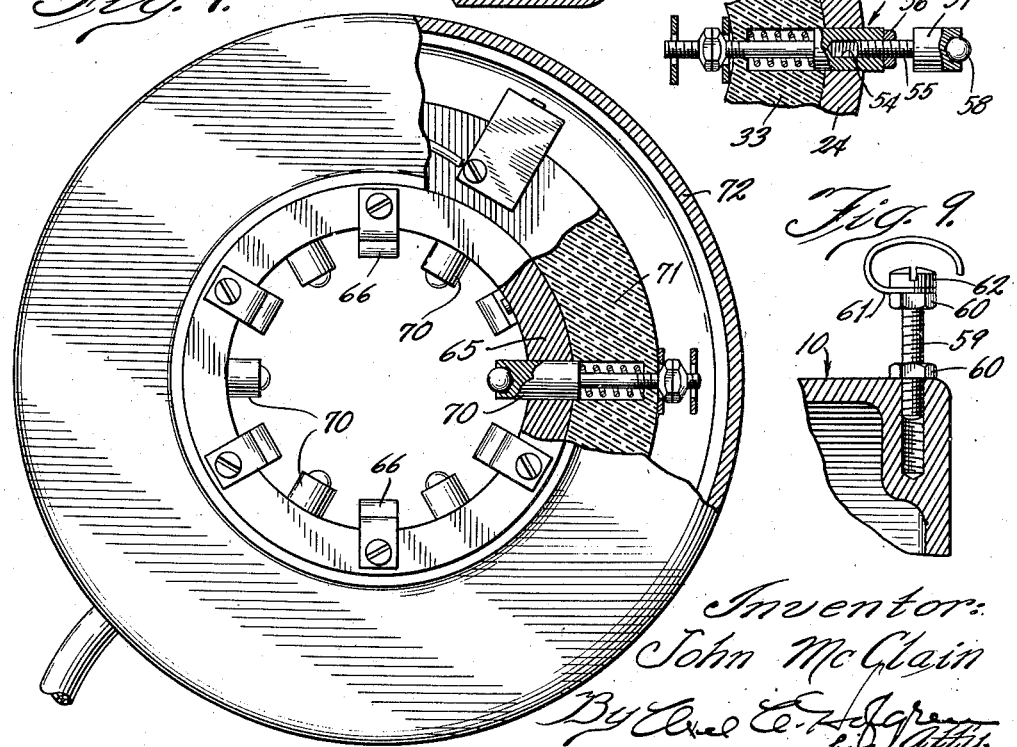
Inventor:
John McClain Patented Mar. 23, 1937

2,074,753

UNITED STATES PATENT OFFICE 2,074,753

GAUGE

John McClain, Chicago, Ill.

Application December 15, 1933, Serial No. 702,547

8 Claims. (Cl. 177—311)

The invention relates generally to gauges, and more particularly to gauges adapted to measure or test the diameter of elongated cylindrical members such as the tubes of a boiler or heater.

In the practice of certain oil-distilling or cracking processes, the high pressure and/or intense heat employed cause distortion and bulging of weak sections of the boiler tubes, and as the operation of the heater continues, the bulged areas gradually enlarge until failure results. Loss due to this cause is in practice reduced by frequent tests of the tubes between periods of operation whereby to detect weakness in the tubes as indicated by such distortion and insure replacement of the weakened tubes before failure thereof.

The primary object, therefore, of the present invention is to provide a new and improved gauge adapted to determine whether or not there are material bulges or variations in diameter in an elongated pipe or tube such as the tube of a boiler.

Another object is to provide such a gauge having means for indicating whether or not such variations exist, and to indicate the circumferential location of such variations in the tube.

Other objects and advantages will become apparent from the following description, taken in connection with the accompanying drawings, in which:

Fig. 1 is a longitudinal central sectional view through a pipe or tube within which is illustrated an internal gauge embodying the features of the invention, a portion of the gauge mechanism being shown diagrammatically.

Fig. 2 is a view taken partially in longitudinal central section through the gauge head.

Fig. 3 is an end elevational view of the gauge head shown in Fig. 2, a portion of the view being taken in section to illustrate the interior construction of the head.

Fig. 4 is an elevational view of a reference disk mounted on the actuating rod of the device, the view being taken along the line 4—4 of Fig. 1.

Fig. 5 is a sectional view showing an alternative form of guide construction.

Fig. 6 is a longitudinal central sectional view through an alternative form of gauge head adapted for use in gauging or measuring the exterior surface of a pipe or tube.

Fig. 7 is an end elevational view, taken partially in section, showing the gauge head illustrated in Fig. 6.

Fig. 8 is a sectional view of an alternative form of feeler construction.

Fig. 9 is a sectional view showing an alternative form of guide construction.

While I have shown in the drawings and will herein describe in detail but two embodiments of the major features of my invention, it is to be understood that I do not thereby intend to limit the invention to the specific forms disclosed, but aim to cover all modifications and alternative constructions falling within the spirit and scope of the invention as expressed in the appended claims.

Each of the two forms of the invention illustrated herein embodies a gauge head adapted for movement longitudinally of a tube in concentric relation thereto so that a plurality of circumferentially spaced feelers carried by the head and riding in contact with the adjacent surface of the tube serve to disclose radial distortion of the tube. Such distortion and its location circumferentially of the tube are made known to the remotely stationed operator by a plurality of indicating devices controlled independently by the several feelers.

The exemplary embodiment of the invention illustrated in Figs. 1 to 4 of the drawings constitutes an internal gauge and comprises a gauge head 10 adapted for movement longitudinally through a boiler tube 11 or the like by means of a tubular rod 12 upon which the head is mounted. As the head is moved through the tube 11, a plurality of circumferentially spaced radially movable feelers 13 mounted on the head 10 are constantly urged outwardly of the head so as to maintain contact with the inner surface of the tube.

To position the head 10 in concentric relation to the tube and thus insure uniform operation of the feelers 13, a plurality of resilient radially projecting guides 14 are positioned at opposite ends of the head in circumferentially spaced relation so as to ride along the inner surface of the tube 11. Similarly, a plurality of rests or guide disks 15 are mounted in longitudinally spaced relation on the rod 12 so as to prevent bending or sagging of the rod and consequent misalinement of the gauge head 10.

When, in the movement of the head 10 through a tube 10, one of the feelers 13 shifts outwardly a predetermined distance into a weakened or bulged area 16 (Fig. 3) in the tube, this particular feeler acts, preferably through electrical means, to control its remotely located indicator such as a light 17 which forms a part of an indicator mechanism shown diagrammatically at 18 in Fig. 1.

Since the gauge head 10 may be rotated from time to time during its movement through the tube, a reference plate 19 is secured to the rod 12 adjacent to its end so as to facilitate determination of the angular location of the area 16. The plate 19 carries identification numerals 20, as shown in Fig. 4, which correspond with the connections between the feelers 13 and the indicator lights 17, which are correspondingly numbered.

The gauge head 10, as shown in Figs. 1 to 3, comprises a cylindrical housing having cup-shaped end caps 21, the side walls 22 of which are detachably secured by screws 23 to opposite ends of a central ring 24. With this construction, the feelers are preferably carried by the central ring 24, while the end caps 21 carry the guides 14 and provide for screw threaded axial connections 25 with the portions of the rod 12 which extend in opposite directions from the gauge head.

The guides 14, in the form shown in Figs. 2 and 3, comprise resilient metal strips 26 extending radially along the inner end surface of the end caps 21 and outwardly through apertures 27 in the side walls 22 thereof. The outer projecting ends of the strips 26 are bent as at 28 to curved or arcuate form to provide for resilient sliding contact with the inner surface of the tube 11. To permit radial adjustment of the guides 14, radial slots 29 are formed in the strips 26, and bolts 30 extend through the end walls of the end caps 21 and through the slots 29 to receive clamp nuts 31. Slotted heads 32 on the bolts 30 permit adjustment of the guides from the exterior of the guide head 10.

Within the central ring 24, which is formed from metal, a ring 33 of insulating material is fixed to carry the electrical control for the indicator 18. Each feeler 13 preferably comprises a plunger 34 (Fig. 3) formed from metal and carrying a bearing ball 35 at its outer end to reduce the friction between the plunger and the tube through which it is moved. Alined bores 36 in the rings 24 and 33 support the plunger 34 for radial movement, and the inner end of the plunger, which extends inwardly beyond the inner surface of the insulating ring 33, has a reduced portion 37 which slides in a coaxial bore 38 of reduced diameter in the ring 33. Surrounding the reduced portion of the plunger 34 within the bore 36 is an expansive coil spring 39 which acts to urge the plunger outwardly into contact with the inner surface of the tube to be tested.

At its projecting inner end each feeler 13 is associated with a contact clip 40 mounted on the insulating ring 33 in such a manner as to limit the movement of the feeler, preferably in both directions. Each clip is formed from metal to provide a side member 41, which is secured in radially extending position on the side of the ring 33 adjacent to one of the feelers 13 by means of a screw 42, with a pair of abutment or contact plates 43 projecting from the side member 41 into the path of its radially movable feeler. The abutment plates 43 are spaced from each other along the path of movement of the feeler and suitable apertures 44 are formed in the plates so that the feeler may extend and move through the plates without lateral contact with the plates as determined by an adjustable contact member 45 screw threaded on the reduced portion 37 of the feeler intermediate the contact plates 43.

While the outer end of a feeler 13 is in abutment with the interior of a truly cylindrical tube 11 of the size for which the gauge is intended, the member 45 on the inner end of that feeler rides substantially midway between the contact plates 43, and when a bulged area such as the portion 16 (Fig. 3) is encountered, the member 45 is shifted outwardly into contact with the outer plate 43. Conversely, the presence of scale or any similar obstruction in the tube will shift the stop 45 into contact with the inner plate 43.

Individual electric circuits are provided (Figs. 1 and 3) from the several feelers 13, a plurality of wires 46 being employed which extend from the several lights 17 of the indicator through the rod 12 and into the gauge head 10 where they are connected to the several clips 40 by means of their mounting screws 42. A common lead wire 47 connected to all of the lights 17 and in circuit with a power source 48, also extends through the rod 12 and is connected to the metal ring 24 by a screw 49 (Fig. 3). Thus the plates 43 and the member 45 constitute a switch and movement of a particular feeler until its member 45 engages either of the contact plates 43 establishes a circuit through the corresponding light 17 of the indicator.

Accurate, finely graduated and easily performed adjustment of the feelers 13, as well as the guides 14, is highly desirable, and in Figs. 5, 8 and 9 various alternative constructions are illustrated which satisfy these requirements. Fig. 5 discloses a guide construction wherein an arm 50 is screw threaded radially into the end cap 21 of the head, a lock nut 51 being provided for fixing the arm in adjusted position. At its projecting outer end the arm 50 carries a bearing ball 52 which is held within the constricted outer end of a bore 53 and is urged outwardly by an expansive spring within the bore.

A generally similar construction is illustrated in Fig. 8 as applied to one of the feelers 13, the plunger 34 having a screw threaded axial bore 54 at its outer end into which a stem 55 is threaded. A lock nut 56 on the stem provides for fixing the stem in the desired adjusted position. At its outer end the stem carries a head 57 in which an outwardly facing bearing ball 58 is mounted.

Fig. 9 discloses an alternative form of guide 14 wherein a bolt 59 carrying a pair of nuts 60 is screw threaded into a radial bore in the head 10. The inner one of the nuts 60 serves as a conventional lock nut, while the outer nut 60 clamps one end of a resilient metal strip 61 against the bolt head 62. The strip is reversely bent to overlie the bolt head 62 so as to provide for resilient sliding contact with the interior of a tube.

In Figs. 6 and 7 the invention is illustrated as embodied in an external gauge adapted to measure or test a tube by contact with various portions of the external surface thereof. In the form shown, the external gauge head comprises an elongated sleeve 65 adapted to surround and slide along a tube 11 in spaced concentric relation thereto as determined by a plurality of resilient guides 66 located at the ends of the sleeve 65 and in spaced circumferential relation to each other. Each guide may, as in the form illustrated, comprise a resilient metal strip fixed at one end to the end of the sleeve 65 by a screw 67, and extending into the sleeve. The inner end of the guide 66 is bent to arcuate form as shown at 68 to facilitate sliding contact with the pipe, and radial adjustment of each guide may be effected by means of a screw 69 threaded radially through the sleeve and engaging the guide between the curved portion 68 and the end of the sleeve.

Radially movable feelers 70 are provided of substantially the same construction as in the embodiment of Figs. 1 to 4, except that the feelers 70 are reversed so as to be pressed radially inwardly from an insulating ring 71 which surrounds and is fixed upon the sleeve 65 intermediate its ends. Similar electrical connections and clips 40 are employed whereby the external gauge may be associated with suitable indicating mechanism such as that illustrated in Fig. 1. A two-part housing 72, 72' is mounted on the sleeve 65 and serves to protect and enclose the clips and other mechanism of the gauge head in a degree comparable to the enclosure of the mechanism in the head 10 of the internal gauge. These parts are preferably separable to give access to the contact mechanism.

From the foregoing it will be evident that the invention provides a simple and effective gauge for detecting the presence of weakened sections in elongated tubes or the like, and that the effectiveness of the device is materially enhanced through its action in designating the locations of such weakened sections.

It will also be apparent that the gauge is sensitive to and indicates to the operator only those variations in the tube which exceed a predetermined maximum, and that the amount of this permissible variation may be readily adjusted by manipulation of parts located exteriorly of the gauge head.

I claim as my invention:

1. A gauge comprising a head, an insulating ring carried by said head, a plurality of plungers slidable substantially radially through said insulating ring, yieldable means urging said plungers radially in one direction, a plurality of clips mounted on said ring, each of said clips having two radially spaced contact elements located adjacent to the path of movement of one of said plungers, contact means on each of said plungers adapted to engage said contact elements of the adjacent clip in both directions of movement, and a plurality of electric indicating devices each having a control circuit including one of the plungers and its associated clip in series.

2. A gauge comprising, in combination, a head adapted to be moved along a tube in concentric relation thereto, a plurality of feelers mounted on said head at spaced points circumferentially thereof for movement substantially radially of said head throughout a limited range, spring means urging said feelers toward one limit of their range of movement, remotely located indicating means having a plurality of electrically controlled indicating devices, one device being provided for each of said feelers, individual control circuits for said devices each including separate switch means having two spaced closed positions and an intermediate open position, and connections between each feeler and its switch means operable to move said switch to one of its closed positions when said feeler reaches either limit of its range.

3. A gauge for detecting radial irregularities of a tube comprising a head adapted to be moved along the tube, a plurality of feelers mounted on said head for independent movement radially inwardly or outwardly of the head, means urging said feelers in one direction radially, a plurality of indicators located remotely with respect to said head providing one indicator for each of said feelers, normally open individual circuits for each indicator, and means including said feelers closing each individual circuit upon a predetermined movement of the corresponding one of said feelers radially inwardly or outwardly of said head.

4. A device of the character described comprising a head adapted to be moved through a hollow member, resilient guide means mounted for radial adjustment on said head and adapted to center the head in such a member as it is moved therethrough, a plurality of feelers mounted on said head at circumferentially spaced points for movement radially thereof, means urging said feelers outwardly into contact with the inner surface of such a member, remotely located indicating means having an indicating device for each of said feelers, a plurality of switches each comprising stationary contact means mounted on the head and a movable contact actuated by one of said feelers, an individual electrical circuit between a feeler and its indicating device including one of said switches through which each feeler energizes its particular indicating device upon predetermined movement of the particular feeler with relation to the head, and adjustable means carried by said feelers for coordinating the radial position of the feelers at which energization of the indicating devices takes place with a radial adjustment of the guides.

5. A gauge for indicating irregularities in tubes comprising, in combination, a central ring and end caps secured to said ring to form a hollow gauge head adapted to be inserted into a tube, guide means carried by said end caps for engaging the inner surface of the tube to center the head therein, an insulating ring mounted in said central ring, a plurality of feelers projecting outwardly from said central ring for contact with the tube at circumferentially spaced points about the ring and mounted in said central ring for radial movement, means urging said feelers outwardly, individual normally open switch means for each of said feelers comprising a contact movable with the feeler and cooperating contact means mounted on said insulating ring and disposed to be engaged by the movable contact upon predetermined movement of the feeler, a plurality of remotely located electrically operated indicating devices, and an individual circuit between each switch means and the indicating device of its particular feeler.

6. A gauge comprising, in combination, a sleeve, guide means adjacent opposite ends of the sleeve adapted to engage the outer surface of a tube to maintain the sleeve in coaxial relation thereto, a plurality of feelers mounted on said sleeve for substantially radial movement and projecting from the outer side thereof through the sleeve for contact with such a tube at a plurality of circumferentially spaced points, means for urging the feelers into contact with the tube, an insulating ring encircling and mounted on said sleeve, a plurality of contact means mounted on said insulating ring, one for each feeler, a movable contact for each feeler normally out of engagement with said contact means actuated by its feeler for cooperating engagement with the contact means upon predetermined movement of the feeler, a two-part annular housing mounted on said sleeve and enclosing said ring and said contact means, remotely located electrically operated indicating means including a plurality of indicating devices, one for each of said feelers, and an individual circuit from each indicating device including in series the contacts of its feeler.

7. A gauge for indicating irregularities in a tube comprising a head having guide means for centering the head with respect to the tube, a plurality of feelers spaced circumferentially about the head and mounted therein for sliding movement radially with respect to the center of the head, means for normally urging said feelers in one direction radially of the head, an elongated actuating handle attached to said head whereby the head may be rotated about the axis of the tube or moved longitudinally along the tube with the feelers in contact with the adjacent surface of the tube, a remotely located indicator having a plurality of individually operable indicating elements, one for each of said feelers, means forming an individual operating connection between each feeler and a corresponding indicating element, and a reference device carried by said rod for coordinating the indicator with the particular rotative position of the gauge head.

8. A gauge comprising a head adapted to be moved along a tube, guide means on the head for centering the same with respect to the tube, a plurality of feelers spaced circumferentially about the head and mounted thereon for movement radially with respect to the center of the head, means for normally urging the feelers in one direction radially, a switch device for each feeler comprising fixed radially spaced contacts and a contact movable with the feeler and disposed between the fixed contacts, said movable contact being normally out of engagement with both fixed contacts and operable upon predetermined movement of the feeler in either direction radially to engage one of the fixed contacts, and means operable to indicate irregularities detected by said feelers and including connections from said switch devices to said last mentioned means.

JOHN McCLAIN.